OR 3,073,992
SEARCH ROOM

Jan. 15, 1963 P. N. WOLFE 3,073,992
DISPLAY DEVICE
Filed Nov. 19, 1959 2 Sheets-Sheet 1

WITNESSES
John C. Healy, Jr.
James F. Young

INVENTOR
Peter N. Wolfe
BY Charles F. Renz
ATTORNEY

Jan. 15, 1963 P. N. WOLFE 3,073,992

DISPLAY DEVICE

Filed Nov. 19, 1959

2 Sheets-Sheet 2

United States Patent Office 3,073,992
Patented Jan. 15, 1963

3,073,992

DISPLAY DEVICE

Peter N. Wolfe, Penn Hills Township, Allegheny County, Pa., assignor to Westinghouse Electric Corporation, East Pittsburgh, Pa., a corporation of Pennsylvania Filed Nov. 19, 1959, Ser. No. 854,077
5 Claims. (Cl. 315—169)

This invention relates to display devices and more particularly to laminated structures for solid state display devices.

It has been shown in copending application Serial No. 628,421, filed December 14, 1956, entitled "Display Systems" by E. A. Sack, Jr. and assigned to the same assignee as the present invention, now Patent 2,917,667, issued December 15, 1959, that there are several different circuit embodiments for achieving control of the light output of the individual elements of a display device. The display device is comprised of many light producing cells, such as electroluminescent cells. These circuit embodiments generally include a constant source or sources of a time varying voltage applied across an electroluminescent cell for excitation of the cell and one or more nonlinear dielectric capacitors, associated with the electroluminescent cell, whose effective capacitance undergoes appreciable change with the application of a direct current control potential. The capacitance changes vary the time varying potential drop across the electroluminescent cell and therefore the light output. The nonlinear dielectric capacitor may comprise, for example, a member of the class of ferro-electric type materials, such as barium titanate or barium-strontium titanate, which have been shown to exhibit the referred to capacitance change.

These display systems present several problems in construction. Since each screen element, in order to provide high resolution, must be small, the formation and interconnection of physically separate elements is prohibitive. One possible method of fabrication is set forth in the copending application Serial No. 730,669, filed April 24, 1958, entitled "Solid State Display Screens" by P. M. G. Toulon and assigned to the same assignee as the present invention, now Patent 2,938,135, issued May 24, 1960. In this copending application, the nonlinear dielectric capacitors are machined from a composite body formed of a sheet of nonlinear dielectric material sandwiched between sheets of conductive material. Conductive material remaining after the machining operation provides leads to external power sources as well as serving as capacitor plates. This is a relatively delicate machining operation.

Another type of structure is that shown in copending application Serial No. 756,182, filed August 20, 1958, entitled "Display Device" by E. A. Sack, Jr. and J. A. Asars and assigned to the same assignee as the present invention, now Patent 2,922,076, issued January 19, 1960, in which the electroluminescent layer, the nonlinear dielectric layer and the necessary electrodes are fabricated in a laminated form. In these structures the electroluminescent layer has a continuous front electrode and elemental back electrodes forming many individual light-producing elements in a unitary structure. A single layer of nonlinear dielectric material, usually in ceramic form, having electrodes, bus bars and perhaps other components of a control and signal distribution scheme are printed or otherwise deposited thereon and placed in contact with the electro-luminescent layer. This type of structure may be readily made without the necessity of costly machining operations. The present invention is primarily directed to an improvement upon the structures shown in this last mentioned copending application. The present invention is further directed to laminated type display devices which incorporate a control structure in the form of a bridge circuit. The bridge circuit control configuration has been found to provide greater control of light output than other known configurations. That is, the change in light output from a display element for a given control signal is high.

In the bridge circuit configuration for the control of the light output of an electroluminescent cell, as described in copending application Serial No. 730,669, filed April 24, 1958, entitled "Solid State Display Screens" by P. M. G. Toulon and assigned to the same assignee as the present invention, now Patent 2,938,135, issued May 24, 1960, two nonlinear dielectric capacitors are used in each element is separate arms of the bridge and the electroluminescent cell is in the cross-circuit member. It is necessary that the control signal be applied to a point common to the two nonlinear dielectric capacitors and the electroluminescent cell. Fabricating a laminated display screen embodying such a circuit was shown in beforementioned copending application Serial No. 756,182. This structure, however, suffers from the drawback that the control input point is internal to the screen and means must be provided to apply the control signal to each element. This necessitates the bringing of control signals from the back of the screen through the nonlinear dielectric layer to the interface between that layer and the electroluminescent layer.

In copending application Serial No. 854,075, filed November 19, 1959, entitled "Display Device" by P. N. Wolfe and assigned to the same assignee as the present invention, a solution to the problem of applying control input signals was provided by laminated screen structures, of the type including bridge circuit control structures, wherein the control input points are on the back of the screen and therefore are readily accessible. This structure provides considerable advantages in fabrication and operation over previous structures. However, it is necessary to supply light power potential between the electroluminescent and nonlinear dielectric layers requiring the disposition of electrodes there for that purpose. The placement of supply electrodes in this position often requires the additional complexity of an insulating layer between the electroluminescent and nonlinear dielectric layers to prevent excitation and breakdown of the electroluminescent layer by the bus bars. Furthermore, in all previously known structures the thickness of the nonlinear dielectric layer was important in that it was by flux lines transversely through this layer that nonlinear dielectric capacitors to control the light output of the electroluminescent layer were formed.

Efforts to improve upon the structure disclosed in beforementioned copending application Serial No. 854,075, to alleviate the foregoing problems, have resulted in an entire new family of laminated display devices made in accordance with the present invention. While the bridge circuit control configuration continues to be preferred, and will be shown in the principal embodiment of the present invention, display devices may be formed according to the present invention which do not include a bridge circuit control configuration. Furthermore, the teachings of the present invention are broadly applicable to solid state display devices comprising an electroluminescent cell and associated control structure even though the electroluminescent cell and control structure are not in a parallel, laminated form.

It is, therefore, an object of the present invention to provide an improved laminated display device for the control of light output from individual light producing elements.

It is another object of the present invention to provide a laminated display device which may be fabricated easily.

It is another object to provide an improved laminated display device to which all potentials may be readily applied.

Another object is to provide an improved method of forming a laminated display device including a control structure in the form of a bridge circuit.

Another object is to provide a display device of an electroluminescent layer and a nonlinear dielectric layer requiring no electrodes between said layers.

Another object is to provide a display device of laminated layers whose operation depends on lateral flux lines.

Another object is to provide a display device wherein control charge leakage does not occur from the control input electrode through the electroluminescent layer.

These and other objects of this invention will be apparent from the following description, taken in accordance with the accompanying drawings, throughout which like reference characters indicate like parts, which drawing forms a part of this application and in which.

Figures 1, 2, 3:
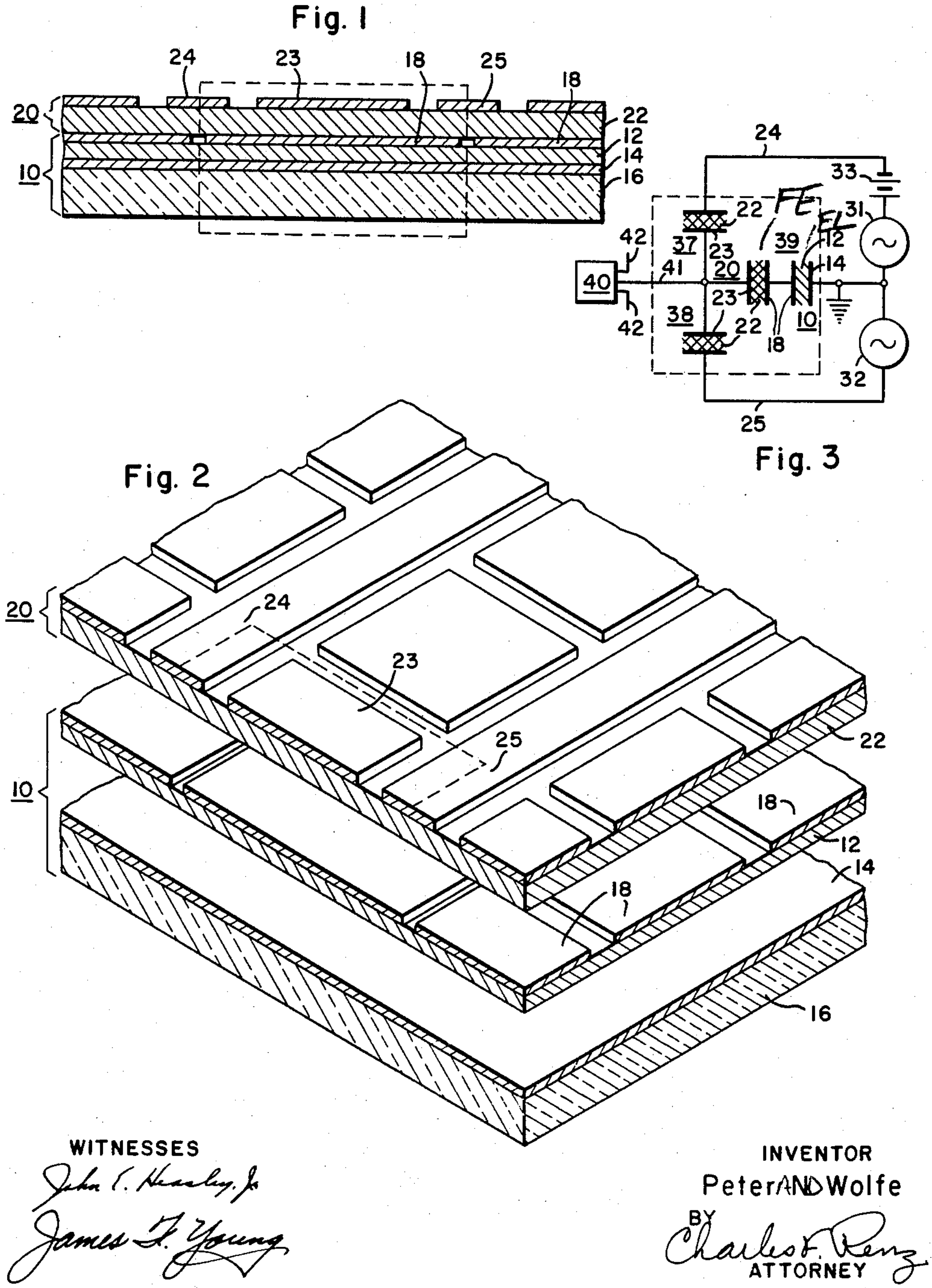
FIGURE 1 is a sectional view of a display device constructed in accordance with this invention.
FIG. 2 is a perspective view of the display device of FIG. 1.
FIG. 3 is an equivalent circuit of the device shown in FIG. 1.

In FIG. 1 and FIG. 2 there is shown a display device comprising an electroluminescent light producing portion 10 and a nonlinear dielectric control portion 20, both portions being in laminar form and adjacent each other. The electroluminescent light producing portion 10 comprises, in a well known manner, a layer 12 of electroluminescent phosphor material in a dielectric binder. The electroluminescent layer 12 may comprise, for example, copper activated zinc sulfide in a binder of polyvinyl chloride. On the front surface of the electroluminescent layer 12 is disposed a continuous conductive light-transmissive electrode 14 and a light-transmissive support layer 16. The support layer 16 may be of a suitable glass and the conductive layer 14 may be of tin oxide formed in a well known manner. On the side of the electroluminescent layer 12 remote from the continuous conductive layer 14 are elemental electrodes 18 of a suitable conductive material disposed in such a pattern that each defines a controllable light producing element. The back electrodes 18 may be formed by evaporating conductive material such as aluminum through a suitable screen. Electroluminescent cells of this type are more fully discussed in the previously mentioned U.S. patent applications and are generally known in the art.

A control structure 20 comprising a layer of nonlinear dielectric material 22 is disposed adjacent the back electrodes 18 on the electroluminescent layer 12. Each element of the nonlinear dielectric layer 22, as defined by the area of the elemental back electrodes 18 of the electroluminescent layer, includes three electrodes 23, 24 and 25 applied to the back of the nonlinear dielectric layer. The electrodes 23, 24 and 25 are disposed in a pattern which repeats for each element of the display device. A single display screen element is shown enclosed within the dotted line. Not all of the electrodes need be confined to any one element of the display device, however. The strip electrodes or bus bars 24 and 25 run across a row of elements. As shown in FIGS. 1 and 2, the strip electrodes 24 and 25 are employed in adjacent rows of elements, although this need not be the case. The structure illustrated by the drawings is shown as a preferred embodiment of the present invention wherein the number of components is meant to be small so as to form a simplified device. In each element an elemental control input electrode 23 is disposed between the two strip electrodes or bus bars 24 and 25.

A nonlinear dielectric material, for purposes of this invention, is a material wherein the time varying component of electric displacement is dependent upon the average value of an applied periodic electric field. Materials which may be termed linear dielectric materials, by reason of not coming within the preceding definition, are, therefore, those wherein the time varying component of electric displacement is independent of the average value of the applied time varying electric field. The significance of this distinction between nonlinear and linear dielectric materials will become apparent hereinafter in the discussion of the operation of a device in accordance with the present invention.

The nonlinear dielectric material 22 may be, for example, selected from the group of materials known as ferroelectric materials, particularly those of the barium titanate type. This class includes, for example, barium titanate, barium-strontium titanate, barium stannate, sodium columbate, sodium tantalate, potassium columbate and potassium tantalate. The preparation of such a material into a ceramic sheet, suitable for use as the layer 22, is discussed in an article in Bulletin of the American Ceramic Society for May, 1954, beginning on page 131, by Callahan and Murray.

An alternative method, found to be preferable over that just described, to form the display screen structure shown in FIGS. 1 and 2 is to begin by fabricating a control portion 20 of the screen and depositing thereon the electroluminescent layer 12 in the form of electroluminescent phosphor material with either a plastic binder or a glass binder. In the instance in which a plastic binder is used a light transmissive front electrode 14 of evaporated gold may be used. On the other hand, if a glass binder is used and applied to the control structure in the form of a frit with the electroluminescent material included therein, firing of the frit will form a glazed surface upon which a light transmissive conductive layer of tin oxide may be formed in the conventional manner. This type structure is preferred over that just previously described because, if the light producing portion 10 and the control portion 20 are made separately, great surface uniformity is required in order that the two layers may be fitted together with uniform contact over all the elements.

In contrast to previously known structures there is no need to provide an insulating layer between the electroluminescent and nonlinear dielectric structures 10 and 20. This is because there are no electrodes between the layers to which potentials are applied which would disturb the light output of the electroluminescent layer 12.

FIG. 3 shows the equivalent circuit of the device of FIGS. 1 and 2. As shown in FIG. 3, each element of the display device is provided in a bridge circuit configuration in which one arm includes a source of light power potential 31 coupled in series circuit relationship to a source of direct current bias potential 33 and the strip electrode or bus bar 24. The strip electrode 24 serves as a lead as well as one plate of a capacitor 37 of which the control input electrode 23 serves as the other plate. The second arm of the bridge circuit includes a second source of light power potential 32 which is coupled in series circuit relationship to the strip electrode or bus bar 25 which serves as a lead and as one plate of a capacitor 38 of which the control input electrode 23 serves as the other plate. The two branches of the bridge circuit, therefore, have as a common point the elemental control input electrode 23 to which the control signal is applied. The second common point of the two branches of the bridge circuit may be between the two light power sources 31 and 32 and may be maintained at ground potential. The cross-branch of the bridge circuit comprises the continuous front electrode 14 on the electroluminescent layer 12 which may be on the ground side of the bridge. This electrode serves as one plate of the electroluminescent cell of which the elemental back electrode 18 serves as the other plate. This capacitor is serially coupled to a nonlinear dielectric capacitor 39 of which the elemental back electrode 18 serves as one plate and the control input electrode 23 serves as the other plate. Suitable values for the light power potential sources 31 and 32 are 300 volts R.M.S. and 100 volts R.M.S., respectively, at 400 c.p.s. The direct current bias potential 33 may be of about 300 volts. The light power potential sources 31 and 32 are phased so as to apply opposing voltages across the electroluminescent cell 10. The light power potential sources 31 and 32 and the direct current bias potential source 33 may, of course, be used to supply potentials to many elements of the display device simultaneously although only one such element is shown in the equivalent circuit of FIG. 3. A signal distribution means, schematicaly shown by the unit 40, is employed to provide control input signals to the elemental control input electrodes 23 in a sequential manner. This signal distribution means may comprise signal modulated electron beam bombardment or signal modulated charge supplied by directly coupled circuit means, for example. The leads 41, 42 and 43 represent the conductors or electron beam paths by which the control signals would be applied. Since the control input electrodes 23 are on the back surface of the display screen, it can be readily seen that a structure formed in accordance with this invention is particularly suitable to the application of control signals by bombardment of a signal modulated electron beam in a well known manner, such as that shown in U.S. Patent 2,888,593 by A. E. Anderson and E. A. Sack, Jr. and assigned to the same assignee as the present invention.

While the capacitor 39 in the cross-branch of the bridge circuit does not greatly contribute to controlling the light output from the electroluminescent cell 10, it does allow the elemental control input electrodes to be on the back surface of the display screen structure where input signals can be readily applied.

The elemental control input electrode 23 serves as a plate of three different capacitors, that is, capacitive coupling to three other electrodes is utilized in each element of the control structure. One capacitor 39 is formed by coupling to the elemental back electrode 18 of the electroluminescent layer. The other two capacitors 37 and 38 are formed by coupling to the electrodes 24 and 25. In the case of capacitors 37 and 38, flexibility in the selection of electrode dimensions is obtained because of the nature of the dependence of characteristics on geometry for capacitors in which flux lines are dominantly lateral as compared with capacitors in which flux lines are transverse to the dielectric material.

In accordance with my invention, light power potentials are provided by the sources 31 and 32 to establish a time varying electric field across the electroluminescent cell 10. By reason of a bridge circuit configuration as shown in FIG. 3 the parameters of the circuit may be adjusted so that there is substantially zero light output from the electroluminescent layer 12 when no control signal is applied to the elemental control input electrode 23. The application of a D.C. control signal to the control input electrode 23 alters the effective impedance of the nonlinear dielectric capacitors 37, 38 to A.C. potential supplied by the light power sources 31 and 32. This impedance change is a result of the nonlinear characteristic of the dielectric materials of the capacitors 37, 38. Because of the bridge unbalancing which thereby results, the field across the electroluminescent cell 10 is altered and the light output is changed to a new level in accordance with the magnitude of the applied control signal. Reference to beforementioned copending application Serial No. 730,669 may be made for further explanation of the operation of the bridge circuit.

Complex signal distribution means may be employed, the circuits of which, furthermore, may be formed directly on the surface of the nonlinear dielectric layer 22.

A principal advantage derived from the disclosed structure is the structural simplification that results from the fact that there need be no insulating layer between the nonlinear dielectric layer 20 and the electroluminescent layer

10. This is made possible because the bus bars 24 and 25 are on the back surface of the nonlinear dielectric layer 22 where the danger of excitation and breakdown of the electroluminescent layer 12 is minimized. Since the bus bars 24 and 25 carry potentials of about 300 volts R.M.S. in addition to a direct current bias of about 300 volts on one of them, it is desirable to keep them remote from the electroluminescent layer 12.

Figure 5:
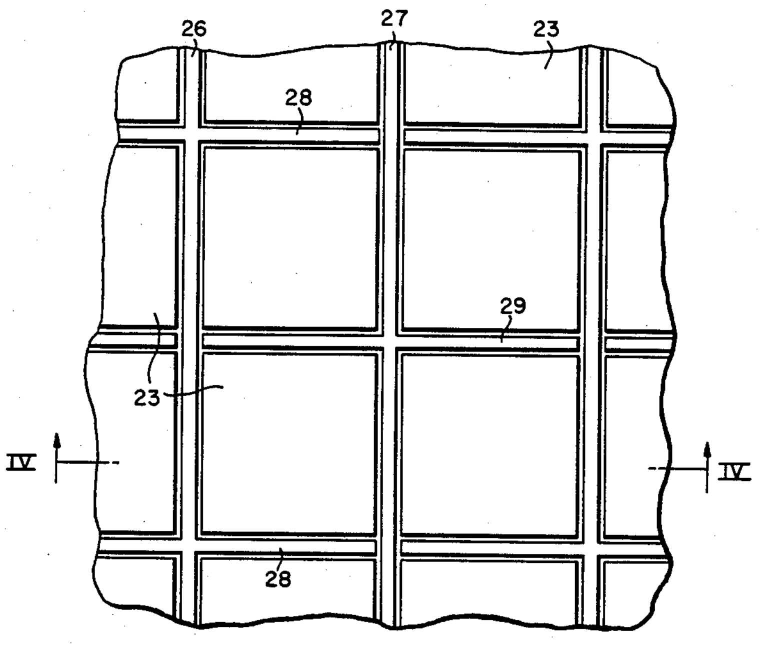
FIG. 5 is a plan view of the embodiment of FIG. 4.
Figure 4:
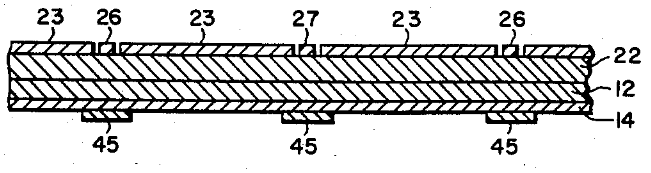
FIG. 4 is a sectional view of an alternative embodiment of this invention.

In FIG. 4 and FIG. 5 an alternate embodiment of my invention is shown. In this embodiment the electroluminescent layer 12 and the nonlinear dielectric layer 22 are in direct contact with each other. A pattern of electrodes is formed on the back of the nonlinear dielectric layer 22 which pattern comprises control input electrodes 23 and bus bars 26 and 27. The bus bars 26 and 27 extend laterally as well as across the length of the display device. The equivalent circuit of this embodiment is the same as that just previously described in FIG. 3, however, the capacitor 39 and the electroluminescent cell 10 are now combined in a single unit. The principal modification of the embodiment of FIGS. 4 and 5 is that no electrodes are provided in the lamination boundary between the electroluminescent layer 12 and the nonlinear dielectric layer 22. It has been found that where there is adequate control of the excitation to the electroluminescent layer, such intermediate electrodes are unnecessary.

The two control capacitors for each bridge are formed by flux across the L-shaped gaps between the control input electrode 23 for that element and the adjacent bus bars 26 and 27. The arms 28 and 29 from the trunks of the bus bars 26 and 27 help to increase capacitive control of the light output and also to isolate the elemental control input electrodes 23 from each other.

In the embodiment shown in FIGS. 4 and 5, no electrodes are provided at the interface between the nonlinear dielectric layer 22 and the electroluminescent layer 12. The primary reason for this modification is that such electrodes contribute to interelement interaction. Interelement interaction is a factor adverse to good picture quality and is therefore undesirable. However, while improved element isolation is obtained by not using interlayer electrodes, the buses 26 and 27, including the arms 28 and 29, are thereby able to excite the electroluminescent layer 12 resulting in the appearance of a pattern of bright areas on the output side of the screen. The interlayer electrodes 18 of FIGS. 1 and 2 shield the electroluminescent layer 12 from bus bar excitation. To avoid the appearance of bright areas to a viewer of the device of FIGS. 4 and 5, an opaque grid 45 may be disposed on the electroluminescent layer 12 to mask the bright areas. Such a grid is preferably formed of a conductive material such as aluminum so that it will thereby aid in carrying current in conjunction with the front electrode 14.

The display device just described has been, for example, fabricated by employing photoresist techniques with nitric acid etching to attain the back electrode pattern 23, 26 and 27 on the nonlinear dielectric layer 22. The electrode material which is etched is, for example, evaporated silver which has been heat treated after evaporation to promote adhesion to the nonlinear dielectric. Following the formation of the electrodes 23, 26 and 27 on the back of the nonlinear dielectric layer 22, the opposite face of the layer is coated with a conventional layer of electroluminescent phosphor such as copper activated ZnS in a suitable dielectric binder such as polyvinyl chloride. Over this layer is evaporated a transparent layer of gold. The masking grid which prevents bright areas from appearing due to direct feed through from the power buses may be a grid of aluminum evaporated over the gold. Protection against flashover across the various electrode gaps when operating the screen in air may be provided by encasing the back surface in a suitable insulating material such as a silicone resin.

Screens such as that just previously described have been fabricated having elements spaced 16 to the linear inch. This is provided by employing control electrodes 23 which are 0.050 inch wide and power buses 26 and 27 which are 0.00625 inch wide. The power buses 26 and 27 and the control electrodes 23 are separated by a control capacitor gap of 0.003125 inch. Of course, these dimensions are not limiting but are merely typical of what may be employed in the practice of my invention. A typical thickness for the nonlinear dielectric layer 22 is of about 0.01 inch. The actual dimensions used in a particular application depend, of course, on the resolution required, the expense permissible in fabrication and other factors.

While the present invention has been shown in only a few forms, it will be obvious to those skilled in the art that it is not so limited but is susceptible of various changes and modifications without departing from the spirit and scope thereof.

I claim as my invention:

1. A display device comprising an electroluminescent cell having a front surface and a back surface, a control structure comprising nonlinear dielectric capacitors disposed on said back surface of said electroluminescent cell and operatively associated with said electroluminescent cell to control the light output thereof, said control structure having a control signal input electrode disposed on said control structure on a surface thereof, said nonlinear dielectric capacitors of said control structure formed by coupling through nonlinear dielectric material between said control signal input electrode and other electrodes disposed on the same surface of said control structure as said control signal input electrode.

2. A display device comprising an electroluminescent cell having a front surface and a back surface, a bridge circuit control structure comprising nonlinear dielectric capacitors disposed on said back surface of said electroluminescent cell and operatively associated with said electroluminescent cell to control the light output thereof, said bridge circuit control structure having a control signal input electrode disposed on said bridge circuit control structure on a surface thereof remote from said electroluminescent cell, said nonlinear dielectric capacitors of said bridge circuit control structure formed by coupling through nonlinear dielectric material between said control signal input electrode and other electrodes disposed on the same surface of said bridge circuit control structure as said control signal input electrode remote from said electroluminescent cell.

3. A display device comprising: an electroluminescent layer; a layer of nonlinear dielectric material disposed adjacent said electroluminescent layer; means for impressing a time varying electric field across said layer of electroluminescent phosphor material thereby causing said layer of electroluminescent phosphor material to electroluminesce at a first value of brightness; means to alter said brightness comprising a configuration of electrodes disposed on the side of said layer of nonlinear dielectric material remote from said electroluminescent layer; means to apply control potential to said configuration of electrodes so as to alter said time varying electric field across said electroluminescent layer by reason of flux linkages between at least two of said electrodes.

4. A display device comprising: a layer of electroluminescent phosphor material having a conductive layer on one side thereof; a layer of nonlinear dielectric material disposed adjacent said layer of electroluminescent phosphor material on the side thereof remote from said conductive layer; a configuration of electrodes disposed on the side of said layer of nonlinear dielectric material remote from said layer of electroluminescent phosphor material comprising at least one light power bus and at least one control input electrode, said at least one light power bus being electrically coupled to said conductive layer through a light power potential source so as to establish a time varying electric field across said layer of electroluminescent phosphor material, said control input electrode electrically coupled to a source of control input signals causing a variation of said time varying electric field by reason of flux linkages between said control input electrode and said light power bus laterally through said layer of nonlinear dielectric material.

5. A display device comprising a plurality of elemental light producing areas and means to control the brightness of the light from said light producing areas; said light producing means comprising a layer of electroluminescent phosphor material between a continuous electrode layer of conductive material and a layer of elemental electrodes; said control means comprising a layer of nonlinear dielectric material adjacent said layer of elemental electrodes having a configuration of electrodes on the remote side thereof, said configuration of electrodes comprising at least one control input electrode, first and second light power buses, said first light power bus conductively coupled to said continuous electrode through a light power potential source and a source of direct current bias voltage, said second light power bus electrically coupled to said continuous electrode through a second light power potential source, said first and second light power buses capacitively coupled to said control input electrode by flux linkages through said layer of nonlinear dielectric material thereby defining a first and second nonlinear dielectric capacitor, said control input electrode capacitively coupled to said elemental electrode thereby defining a third non-linear dielectric capacitor.

References Cited in the file of this patent

UNITED STATES PATENTS

| | | |
|---|---|---|
| 2,875,380 | Toulon | Feb. 24, 1959 |
| 2,877,376 | Orthuber | Mar. 10, 1959 |
| 2,928,015 | Bartels | Mar. 8, 1960 |
| 2,928,974 | Mash | Mar. 15 1960 |
| 2,967,904 | Toulon | Jan. 10, 1961 |